United States Patent [19]

Carlson

[11] 3,817,997

[45] June 18, 1974

[54] PROCESS FOR PREPARING DIMORPHOLINODIETHYL ETHER

[75] Inventor: Sheldon D. Carlson, Woodridge, Ill.

[73] Assignee: Jefferson Chemical Company, Inc., Houston, Tex.

[22] Filed: June 26, 1972

[21] Appl. No.: 266,311

[52] U.S. Cl.... 260/246 B, 260/2.5 AC, 260/75 NC, 260/77.5 AC
[51] Int. Cl............................................ C07d 87/40
[58] Field of Search... 260/247.7 A, 247.5 R, 246 B Primary Examiner—Nicholas S. Rizzo
Assistant Examiner—Jose Tovar
Attorney, Agent, or Firm—Terrence D. Dreyer; John R. Kirk, Jr.

[57] ABSTRACT

Amine residues formed by contacting diethylene glycol and ammonia are employed in a process to provide 2,2'-bis(4-morpholino)diethyl ether, a valuable polyurethane catalyst.

4 Claims, No Drawings

PROCESS FOR PREPARING DIMORPHOLINODIETHYL ETHER 2,2'-Bis(4-morpholino)diethyl ether, hereinafter dimorpholinodiethyl ether, is a valuable urethane catalyst. This compound has been heretofore described and employed as a polyurethane catalyst as shown by U.S. Pat. No. 3,645,925, issued Feb. 29, 1972.

In Example I of said patent, dimorpholinodiethyl ether is therein described as being prepared by reacting morpholine and diethylene glycol. Although such described process is a means for providing dimorpholinodiethyl ether, the instant invention represents an improved method for preparing large quantities of dimorpholinodiethyl ether at high yields and at relatively low cost.

In accordance with this invention, an intractable amine residue is contacted under selective conditions with a hydrogenation catalyst to provide dimorpholinodiethyl ether. The surprising and advantageous feature of this process is that dimorpholinodiethyl ether, a very valuable product, is readily prepared from a very low cost and intractable amine source. Especially noteworthy is the fact that the subject process need employ only said amine residue and a hydrogenation catalyst. The surprising and economical nature of our process will become self-evident.

The amine residues employed in accordance with this invention are the high boilers contained in the reaction product formed when diethylene glycol and ammonia are reacted together, such as in the conventional morpholine process.

The reaction of diethylene glycol and ammonia to provide morpholine is a conventional process and is exemplarily described in U.S. Pat. No. 3,151,112.

Typically, in the morpholine process unreacted diethylene glycol, by-product 2-(2-aminoethoxy)ethanol, (hereinafter DIGLYCOLAMINE product) and the like, can be recycled to the reactor for additional morpholine production, the morpholine and lower boiling products having been separated by distillation, or by other conventional recovery techniques. Obviously, the morpholine reaction product additionally contains products boiling higher than diethylene glycol (B.P. 245° C. at 760 mm.) which are generally not suitable for recycle and constitute what is considered a higher boiling amine residue fraction. This higher boiling fraction, in addition to containing some unseparated diethylene glycol, contains various amine by-products such as 4-[2-(2-amino-ethoxy)ethyl]morpholine, 1,2-bis(4-morpholino)ethane, 4-[2-(2-hydroxyethoxy)ethyl]morpholine, dimorpholinodiethyl ether, and other heavier molecular weight materials and unidentified products.

It is, of course, preferred in the morpholine process, to separate as much of the valuable diethylene glycol from the higher boiling amine products as is practical and thereby the higher boiling amine fraction is essentially free of diethylene glycol. Although the various ratios of the compounds comprising these higher boiling amine fractions can vary somewhat depending on the reaction conditions, and the like, employed when diethylene glycol and ammonia are reacted, the major components contained therein remain essentially the same regardless of the conditions used.

It is recognized, therefore, that when diethylene glycol and ammonia are reacted under hydrogenation conditions that higher boiling amine compounds are produced that were heretofore considered of comparatively little value. As previously indicated, however, these higher boiling amine compounds include the subject compound dimorpholinodiethyl ether. Recovery of dimorpholinodiethyl ether from these other products boiling higher than diethylene glycol is relatively difficult and expensive, primarily because of the presence of closer boiling compounds, many unidentified, and particularly the compound 4-[2-(2-hydroxyethoxy)ethyl]morpholine.

Unexpectedly, however, when such a higher boiling amine fraction is treated according to our invention, the net amount of dimorpholinodiethyl ether contained in said fraction is vastly increased, and the concentration of close boiling known and unidentified components is decreased, if not eliminated. Advantageously, due to treatment of this higher boiling amine fraction in accordance with our invention, the dimorpholinodiethyl ether can now be easily separated by simple distillation procedures. The large amounts of this valuable product obtained in high yields from the otherwise intractable amine residue of the diethylene glycol and ammonia process were truly surprising.

Therefore, in accordance with my invention, the described higher boiling amine products from the diethylene glycol and ammonia process can be utilized to provide the valuable product dimorpholinodiethyl ether.

My invention, therefore, comprises contacting an amine residue with a hydrogenation catalyst under particular reaction conditions. The amine residue of my invention, as hereby defined, is that portion of the reaction product that remains as a residue after essentially removing from said reaction product diethylene glycol, and compounds boiling at a lower temperature than diethylene glycol, wherein said reaction product is that which is obtained by reacting diethylene glycol with ammonia at a temperature within the range of about 150° to 400° C., and a pressure in the range of about 450 to 6,000 psig. in the presence of a hydrogenation catalyst. Preferably, said reaction product is obtained by reacting diethylene glycol and ammonia at a temperature within the range of about 175° to 300° C. and a pressure in the range of about 750 to 3,500 psig. in the additional presence of hydrogen. It is also preferred that the diethylene glycol and ammonia reaction be conducted so that a molar excess of ammonia is employed. Generally, the mol ratio of ammonia to diethylene glycol is in the range from about 1:1 to 10:1 and the total grams of feed, i.e., ammonia, diethylene glycol and water, if any, is such that an amount in the range of .1 to 10 grams of feed per millimeter of catalyst per hour are employed. As indicated, the feed in addition to ammonia and diethylene glycol can contain from about 0 to 90 wt. percent water based on the total weight of ammonia and diethylene glycol employed. As previously stated, the use of hydrogen in the ammonia-diethylene glycol reaction is optional, but its use is preferred. It is recognized that although hydrogen is not consumed in the diethylene glycol-ammonia reaction, the presence of hydrogen is believed to preserve catalyst activity and otherwise inhibit the self-generation of hydrogen by the hydrogenation-dehydrogenation catalyst from the products present in the reaction. Generally, therefore, at least one percent of the total pressure employed is provided by hydrogen. Higher partial pressures of hydrogen can, of course, be used.

The hydrogenation catalyst used in forming said reaction product from ammonia and diethylene glycol can be any hydrogenation catalyst that promotes the addition of hydrogen to unsaturated carbon to carbon linkages.

The hydrogenation catalysts employed for treating said amine residue according to this invention can be the same, or can be different from, that employed in forming said reaction product from diethylene glycol and ammonia. Representative hydrogenation catalysts suitable for either or both of the above reactions include the following metals and compounds containing these metals, or admixtures thereof: nickel, copper, iron, palladium, platinum, rhodium, cobalt, chromium, manganese, titanium, molybdenum, vanadium, ruthenium, and the like. The metals can be employed as such, for example, in the finely divided states, as the oxides, as mixtures of the aforementioned, and the like. Raney nickel, nickel phosphate, and the like, are other representative catalysts. The metal or metal-containing compounds can be supported on other materials such as porcelain, alumina, silica, pumice, bauxite, kieselguhr, Filtros, mixtures thereof, and the like. The catalyst, with or without a support, is suitable for use in either a batch or continuous flow system. Compounds such as magnesium carbonate, sodium and potassium sulfate, and the like, can be jointly employed with the hydrogenation catalyst, with or without a support, as a modifier, stabilizer, or to otherwise preserve catalytic activity.

Preferably, the catalyst contains one or more of the metals of nickel, and/or cobalt, in combination with copper. At least one of these is also preferably employed in combination with one or more of chromium oxide, molybdenum oxide, thorium oxide, or manganese oxide.

Particularly desired is a catalyst containing (calculated on an oxygen-free basis) 60 to 85 mol percent nickel, or cobalt, or admixtures thereof, about 14 to 37 mol percent copper and about 1 to 5 mol percent of a non-reducible metal oxide such as chromium oxide, manganese oxide, molybdenum oxide or thorium oxide. Of these, chromium oxide is preferred. Some especially prferred catalysts are those initially prepared such as according to U. S. Pat. No. 3,152,998. They can be provided in the form of their oxides, and then treated with hydrogen, causing a reduction of at least a portion of the nickel and/or cobalt and copper to their metallic form. As indicated, the chromium oxide is not so reduced to the metallic form.

In like manner, the said amine residue, obtained as described above, is contacted with the described hydro-genation catalyst, at a temperature in the range of about 180° to 300° C., preferably 200° to 260° C. and a pressure in the range of about 200 to 10,000 psig., preferably 800 to 3,000 psig. The space velocity, i.e., the grams of amine residue feed employed per millimeter of catalyst per hour, is in the range of 0.1 to 10, preferably 0.5 to 3, and most preferably above 1.5. As previously described in the diethylene glycol-ammonia reaction, use of hydrogen is an optional feature, but its use is preferred. Likewise, from 0 to 90 wt. percent of the amine residue feed, preferably 10 percent to 60 percent of the total feed, comprises water. As herein stated, neither ammonia nor diethylene glycol are necessarily used according to my invention. If employed, however, they can be added with the amine residue feed in an amount equal to about 1 to 50 wt. percent of the total weight of the amine residue.

The dimorpholinodiethyl ether can be easily recovered from the amine residue reaction product that has been formed, according to my invention, by conventional separation procedures such as by simple distillation, and the like. Expedients such as recycling the lighter and/or the heavier than dimorpholinodiethyl ether fractions back to the reactor as an additive to the amine residue feed can be beneficial. Likwise, the heavies can also be recycled to the separator to aid in dimorpholinodiethyl ether recovery, if desired. It is obvious that the use of ammonia and/or diethylene glycol with the amine residue is not particularly an economically sound feature because it is unnecessary and expensive.

As herein indicated, said amine residue, as recovered from the typical morpholine process, can be essentially free of diethylene glycol since the diethylene glycol could have been recycled as feed in such a process. However, because I have provided a means of beneficially utilizing said amine residue from the ammonia-diethylene glycol reaction, it is no longer necessary when this reaction is conducted for producing morpholine that great efforts be made to separate all the unreacted diethylene glycol for recycle. Accordingly, diethylene glycol can be slopped to said amine residue in essentially any amount desired. Thus, the practitioner who desires to contact said amine residue, as herein defined, by incorporating diethylene gylcol and/or ammonia with the said amine residue feed can use such amounts of each individually in an amount to provide 1 to 50 wt. percent thereof based on the weight of said amine residue.

Illustrative of the foregoing discussion and description, and not to be interpreted as a limitation on the scope thereof or on the materials therein employed, the following examples are presented.

EXAMPLE I

The following example is representative of, and typically describes, a morpholine process wherein diethylene glycol and ammonia are reacted.

32 pounds of diethylene gylcol and 18.5 pounds of an 80 percent aqueous ammonia solution are continuously pumped into a reaction chamber at a rate of 2,400 grams of total feed per hour. Hydrogen is introduced continuously at a rate of 10 SCF per hour. The reaction chamber contains 1,200 milliliters of a pelleted hydrogenation catalyst comprising 75 atom percent nickel, 23 atom percent copper and 2 atom percent chromium calculated on an oxygen-free basis.

The reaction chamber is maintained at a pressure of 3,000 pounds per square inch at a temperature of 260° C. The product is collected and distilled to provide a lights portion and a morpholine fraction which is recovered. Unreacted diethylene glycol and amine products boiling between morpholine and diethylene glycol are recycled to produce additional morpholine. Those products boiling higher than diethylene glycol are termed amine residue and can be employed as feed in accordance with this invention. As stated, the light portion typically includes such compounds as ethylenediamine, monomethylglycol ether, N-ethylmorpholine, and N-methylmorpholine. The intermediate fraction that is recycled to provide additional morpholine typically includes such compounds as 4-(2-ethoxyethyl)- morpholine, 4-(2-aminoethyl)morpholine, DIGLYCOLAMINE product, in addition to diethylene glycol. The stated amine residue includes such compounds as 4-[2-(2-aminoethoxy)ethyl]morpholine, 1,2-bis-(4-morpholine)ethane, 4-[2-(2-hydroxyethoxy)ethyl]morpholine, 2,2'-bis(4-morpholino)ethyl ether, various unknown and unidentified materials and heavies. A substantial portion of the unknowns are believed to be ($HOCH_2CH_2OCH_2CH_2)_2NH$ or $HOCH_2CH_2NHCH_2CH_2OCH_2CH_2OH$, although this fact has not been clearly proven.

EXAMPLE II

Amine residues were prepared in the manner described by the method of Example I and treated with a hydrogenation catalyst similar to that of Example I. Two 25-gallon continuously operated reactors in a series were employed. A hydrogen pressure of 1,000 psig. was employed. Space velocity of the feed and product effluent was 2.1. The amine residue feed components, in area percent, and effluent components, in area percent, i.e., A percent, were determined by GLC and are reported in Table 1. The amine residue feed rate was 35 gallons per hour. The various runs at the reported temperatures represent the peak temperature of the catalyst bed.

EXAMPLE III

The following example further exemplifies treating amine residue from the diethylene glycol-ammonia reaction in accordance with this invention. Representative runs are reported in Table 2. As is evidenced by the former examples and from the following representative runs, neither the presence of ammonia nor diethylene glycol is required to provide the subject dimorpholinodiethyl ether in excellent yields. Also demonstrated herein is the fact that morpholine can also be employed as an optional feed component. It should be noted that if morpholine is so employed, water as a heat sink for temperature control is preferably used.

The representative runs clearly demonstrate the surprising fact that said amine residue need only be contacted, as herein described, with a hydrogenation catalyst to provide the valuable product dimorpholinodiethyl ether. The runs reported in this example were conducted in a 500 milliliter continuous reactor containing a nickel-copper-chromium hydrogenation catalyst. A gas feed of 75 percent hydrogen-25 percent nitrogen was fed at 76 liters per hour (STP). The net DMDEE percentage reported represents the percentage of dimorpholinodiethyl ether contained in the product effluent relative to the amount of dimorpholinodiethyl ether contained in the original feed composition. It will be appreciated that in those runs where morpholine is added as a feed component, the net DMDEE percentage reported does not take into account the addition of such materials to the feed.

TABLE 2

| Run No. | Feed composition (wt. percent) | | | | | Conditions | | | Net DMDEE,[b] percent |
|---|---|---|---|---|---|---|---|---|---|
| | Amine residue | $H_2O$ | $NH_3$ | DEG | Morpholine | Space velocity[a] | Total pressure | Reactor temp., °C. | |
| 1 | | | | 23.3 | 76.7 | 2.0 | 2,700 | 220 | (c) |
| 2 | 100 | | | | | .65 | 2,000 | 230 | 289 |
| 3 | 100 | | | | | .65 | 2,000 | 250 | 295 |
| 4 | 100 | | | | | 2.0 | 2,000 | 250 | 124 |
| 5 | 70 | 30 | | | | 2.0 | 1,000 | 230 | 118 |
| 6 | 56 | 30 | | 14 | | 2.0 | 1,000 | 240 | 104 |
| 7 | 66.7 | 28.3 | 5.0 | | | 2.0 | 2,700 | 240 | 128 |
| 8 | 50 | | | | 50 | 2.0 | 2,700 | 230 | 287 |
| 9 | 35 | 30 | | | 35 | 2.0 | 2,700 | 230 | 387 |

[a] Space velocity grams of feed/ml. of catalyst/hr.
[b] 2,2'-bis(4-morpholino)diethyl ether.
[c] Product contained ≈21 area percent DMDEE (water-lights free).

TABLE 1

| Amine residue | Components, A percent | Composition of effluent, components A percent | | | |
|---|---|---|---|---|---|
| | | Run 1, 140° C. | Run 2, 196° C. | Run 3, 225° C. | Run 4, 235° C. |
| Morpholine | | 30.8 | 23.4 | 19.3 | 20.1 |
| Lights[a] | 0.1 | 21.3 | 29.9 | 13.3 | 13.8 |
| Unknown No. 1 | | | 5.8 | 14.4 | 13.0 |
| DEG/DGA[b] | 10.8 | 9.0 | 5.5 | 1.6 | 1.1 |
| Unknown No. 2 | 2.1 | 1.3 | 1.7 | 3.6 | 3.0 |
| AEEM/HEEM[c] | 34.0 | 39.6 | 33.7 | 25.5 | 25.0 |
| Unknown No. 3 | 0.5 | .6 | 2.6 | 4.7 | 4.4 |
| DME[d] and unknown No. 4 | 15.6 | 13.2 | 6.1 | 1.6 | 1.4 |
| Unknown No. 5 | 1.8 | 0.6 | 0.8 | 0.9 | 0.6 |
| DMDEE[e] | 19.2 | 20.7 | 31.1 | 37.3 | 40.2 |
| Heavies | 15.9 | 15.0 | 12.7 | 10.4 | 10.4 | a Effluent composition reported includes N-methylmorpholine, N-ethylmorpholine and 4-(2-methoxyethyl)morpholine.
b Diethylene glycol/DIGLYCOLAMINE product [2-(2-amino-ethoxy)ethanol].
c 4-[2-(2-Aminoethoxy)ethyl]morpholine/4-[2-(2-hydroxyethoxy) ethyl]morpholine.
d 1,2-Bis(4-morpholino)ethane.
e 2,2'-Bis(4-morpholino)diethyl ether.

The preceding examples can be repeated with similar success by substituting the generically and specifically described reactants and conditions of this invention for those employed in the recited examples. As will be evident to those skilled in the art, various modifications of this invention can be made or followed in light of the discussion and disclosure herein set forth without departing from the spirit or the scope thereof.

I claim:
1. A process for preparing 2,2'-bis-(4-morpholino)diethyl ether comprising contacting an amine residue, defined here below, with a hydrogenation catalyst at a temperature within the range of about 180° to 300° C. and a pressure within the range of about 200 to 10,000 psig., wherein said amine residue is obtained by reacting diethylene glycol with ammonia at a temperature within the range of about 150° to 400° C. and a pressure in the range of about 450 to 6,000 psig. in the presence of a hydrogenation catalyst and essentially removing diethylene gylcol and compounds boiling at a lower temperature than diethylene glycol.

2. The process of claim 1 wherein said contacting of said amine residue is conducted at a temperature within the range of 200° to 260° C. and a pressure in the range of about 800 to 3,000 psig. and said reacting of diethylene glycol with ammonia is conducted at a temperature within the range of 175° to 300° C. and a pressure within the range of about 750 to 3,500 psig.

3. The process of claim 2 wherein said contacting and said reacting is conducted with a hydrogenation catalyst containing one or more of nickel, cobalt, copper, or admixtures thereof.

4. The process of claim 3 wherein said hydrogenation catalyst consists of 60 to 85 mol percent nickel, or cobalt or admixtures thereof, 14 to 37 mol percent copper and 1 to 5 mol percent of chromium oxide, manganese oxide, molybdenum oxide or thorium oxide calculated on an oxygen-free basis.

* * * * *